US007478754B2

(12) United States Patent
Gurevich et al.

(10) Patent No.: US 7,478,754 B2
(45) Date of Patent: Jan. 20, 2009

(54) AXIAL CHROMATIC ABERRATION AUTO-FOCUSING SYSTEM AND METHOD

(75) Inventors: Vladimir Gurevich, Stony Brook, NY (US); Mark Krichever, Hauppauge, NY (US); Bradley S. Carlson, Northport, NY (US); Chinh Tan, Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 229 days.

(21) Appl. No.: 10/648,176

(22) Filed: Aug. 25, 2003

(65) Prior Publication Data

US 2005/0045725 A1     Mar. 3, 2005

(51) Int. Cl.
    *G03B 7/08* (2006.01)
(52) U.S. Cl. .................. 235/462.24; 235/454; 235/469; 235/462.04; 235/462.22; 235/462.23; 348/347
(58) Field of Classification Search .................. 235/454, 235/469, 462.01, 462.04, 462.22, 462.23, 235/462.24; 382/128; 348/347
    See application file for complete search history.

(56) References Cited

U.S. PATENT DOCUMENTS

| 4,192,452 A | * | 3/1980 | Hashimoto et al. .......... 235/471 |
| 4,274,107 A | * | 6/1981 | Tamura et al. ............ 348/225.1 |
| 4,958,064 A | * | 9/1990 | Kirkpatrick ................. 235/384 |
| 4,992,859 A | * | 2/1991 | Yoshida ...................... 348/347 |
| 5,192,856 A | * | 3/1993 | Schaham ................ 235/462.24 |
| 5,295,077 A | * | 3/1994 | Fukuoka ...................... 358/479 |
| 5,371,361 A | | 12/1994 | Arends et al. |
| 5,378,881 A | * | 1/1995 | Adachi ................... 235/462.09 |
| 5,434,403 A | * | 7/1995 | Amir et al. ............. 235/462.26 |
| 5,468,950 A | * | 11/1995 | Hanson ...................... 235/454 |
| 6,363,220 B1 | | 3/2002 | Ide |
| 6,483,555 B1 | * | 11/2002 | Thielemans et al. ......... 348/745 |
| 6,981,642 B2 | * | 1/2006 | Krichever ................... 235/454 |
| 7,019,919 B2 | * | 3/2006 | Wakai et al. ................ 348/347 |
| 2004/0190762 A1 | * | 9/2004 | Dowski et al. .............. 382/128 |

FOREIGN PATENT DOCUMENTS

| EP | 0 335 656 A1 | 10/1989 |
| EP | 0 433 593 A3 | 6/1991 |
| EP | 0433593 A2 | 6/1991 |
| WO | 02/092246 A1 | 11/2002 |

\* cited by examiner

*Primary Examiner*—Michael G Lee
*Assistant Examiner*—Kristy A Haupt
(74) *Attorney, Agent, or Firm*—Carter, DeLuca, Farrell & Schmidt, LLP

(57) ABSTRACT

A system and method utilizing the principles of axial chromatic aberration for auto-focusing an image onto an image sensor are provided. The system and method are particularly suitable for incorporation within an optical code reader. A signal processor analyzes data signals representative of the intensity or magnitude of wavelength components of an impinged image onto the image sensor for determining a value indicative of the focus quality of the impinged image. An actuator controls movement of a lens in accordance with the determination until obtainment of a desired focus quality. A decoder decodes the image having the desired focus quality.

27 Claims, 5 Drawing Sheets

AXIAL CHROMATIC ABERRATION AUTO-FOCUSING SYSTEM AND METHOD

BACKGROUND OF THE INVENTION

1. Field of the Invention

This invention relates to imaging in optical code reading devices. More particularly, the present invention relates to a system and method for auto-focusing an image utilizing the principles of axial chromatic aberration.

2. Description of the Related Art

Auto-focusing systems in conventional cameras, optical code readers, etc. generally employ devices to determine the distance between the auto-focus device and the selected target or object before moving one or more lenses for focusing the object. Typically, such devices utilize the triangulation technique for measuring distances.

An image sensor based on the triangulation technique comprises an illumination device, such as an LED or a laser, and a detector, such as CCD. The illumination device projects a light-dot on the object. A proportion of the light reflected from the object's surface passes through a lens situated in front of the camera, optical code reader, etc. and onto a number of sensing elements in the camera. The angle at which the reflected light projects onto the sensing elements is established and the distance between the sensor and the object is determined through a number of calculations. One or more lenses are then automatically moved in accordance with the measured distance for auto-focusing the camera, optical code reader, etc.

This triangulation technique is typically prone to errors due to parallax, especially for nearby objects, as is generally the case for optical code readers used to image optical codes. Parallax is a change in the object's apparent position due to a change in the position of the sensor.

Another distance measuring technique utilizes the principle of image frequency content analysis. A distance measuring system employing image frequency content analysis impinges a beam on an optical target and captures the reflected beam for processing by an image sensor having an array. The principle of image frequency content requires the system to measure the value of each pixel within the predetermined array and compare that value to the value of adjacent pixel to determine the difference in pixel values.

The process repeats for all the pixels within the array where the sum of all the differences in pixel values is determined as an absolute value, thereby indicating a level of contrast in the array. Generally, the higher the measured contrast is, the sharper (i.e. more focused) the image of the optical target. However, a system employing this principle necessitates additional processing steps to calculate the differences in pixel values and determine the level of contrast in the image of the optical target. In such a system, the necessity of additional processing steps limits the response time of the system.

Accordingly, a need exists for a system and method for auto-focusing an image that are not prone to parallax errors, provide instantaneous or real-time focusing of an image, and configurable and adaptable for incorporation in various devices, such as cameras and mobile and stationary optical code readers.

SUMMARY OF THE INVENTION

It is an aspect of the present invention to provide an auto-focusing system and method that are not prone to parallax errors and (non-parallax) and provide instantaneous or real-time auto-focusing of an image.

Another aspect of the present invention is to provide an auto-focusing system and method configurable and adaptable for incorporation in various devices, such as cameras and mobile and stationary optical code readers.

Another aspect of the present invention is to provide an auto-focusing system and method utilizing the principles of axial (or longitudinal) chromatic aberration for determining a focus quality of an image impinged onto an image sensor and adjusting, if necessary, at least one lens for changing the focus quality of the image. Axial chromatic aberration occurs because a lens focuses different colors in different image or focal planes. This is because focal length depends on refraction and the index of refraction for blue light (shot wavelengths) is larger than that of red light (long wavelengths). The amount of axial chromatic aberration depends on the dispersion of the glass. One way to minimize axial chromatic aberration is to use glasses of different dispersion in a doublet or other combination. However, since the present invention utilizes the principles of axial chromatic aberration for determining a focus quality of an image for focusing the image, the present invention calls for a lens (or optics) which has an optimum rather than minimum axial chromatic aberration.

A system and method for auto-focusing an image are herein disclosed which achieve the above aspects and other aspects of the present invention. The system and method for auto-focusing an image in accordance to the present invention utilize the principles of axial chromatic aberration. Accordingly, the system and method in accordance with the present invention are not prone to parallax errors, provide instantaneous or real-time auto-focusing of an image, and are configurable and adaptable for incorporation in various devices, such as cameras and mobile and stationary optical code readers.

In one embodiment of the present invention, an axial chromatic aberration auto-focusing system includes an illumination apparatus, a color image sensor, a signal processor, and a controller for actuating an actuator coupled to a lens for moving the lens along an optical axis of the system. Preferably, the auto-focusing system of the present invention is configured and dimensioned to fit within a conventional form factor of an optical code reader, such as the SE900 and SE1200 form factors developed by Symbol Technologies, Inc. The optical code reader further includes an actuation mechanism, such as a trigger assembly, button, or switch, for activating the auto-focusing system.

According to the present invention, the illumination apparatus includes an illumination source, such as one or a plurality of LEDs, for illuminating a target region having an optical code, such as a barcode symbol. The light impinges upon the optical target and reflects back towards the optical code reader as reflected light. A portion of the reflected light substantially propagates towards the lens coupled to the actuator. The moveable lens adjusts an image property, such as focus quality, of the reflected light by moving along the optical axis of the optical code reader during actuation of the actuator. A feedback system of the auto-focusing system controls the actuation of the actuator for moving the lens. The feedback system includes the color image sensor, the signal processor, and the controller.

The image traverses the lens and impinges upon a planar surface, i.e., imaging plane, of the color image sensor. The color image sensor includes sensors for detecting more than one wavelength component of the impinged image, preferably, the blue, red, and green wavelength components of the impinged image. The color image sensor includes an interface for communicating values representative of the impinged wavelength components to the signal processor in the form of data signals where each data signal corresponds to a particular wavelength component of the impinged image. Preferably, the data signals are representative of the intensity or magnitude of the blue, red and green wavelength components impinging on the color image sensor.

The signal processor analyzes the data signals utilizing the principles of axial chromatic aberration to determine a focus quality of the impinged image on the imaging plane. One analysis method entails determining whether a difference value representative of a blue minus red wavelength component (i.e., sharpness difference) obtained by subtracting the value representative of the intensity or magnitude of the red wavelength component from the value representative of the intensity or magnitude of the blue wavelength component is within a predetermined desired range.

The determination includes accessing by the signal processor an external memory storing a look-up table or other data structure storing the predetermined desired range. The predetermined desired range can also be stored within a memory of the signal processor, such as ROM. The sharpness difference is a focus discriminator, since it enables the system to determine whether the image has a desired focus or not, and whether to adjust the position of the lens.

Another analysis method entails determining whether the value representative of the intensity or magnitude of a particular wavelength component impinging on the imaging plane substantially equals a stored value representative of the maximum intensity or magnitude for the particular wavelength. If not, a difference value (i.e., resulting value) is obtained and correlated with a look-up table or other data structure to determine the amount of movement for the lens.

In accordance with one of the above analysis, the signal processor generates and transmits a control signal to the controller for generating an actuation signal for actuating the actuator and moving the lens towards the image sensor or away from the image sensor. The feedback system continues to generate and analyze data signals to determine when the image has a desired focus, for example, a focus suitable for decoding the image representative of the optical code. The process is virtually instantaneous providing the ability for the auto-focusing system to auto-focus in real-time. This is critical in applications where the auto-focusing system is part of a mobile or stationary optical code reader positioned for focusing and reading optical codes in several microseconds on objects moving rapidly through the reader's field of view.

BRIEF DESCRIPTION OF THE DRAWINGS

Various embodiments of the invention will be described herein below with reference to the figures wherein.

DETAILED DESCRIPTION OF THE PREFERRED EMBODIMENTS

Figure 1:
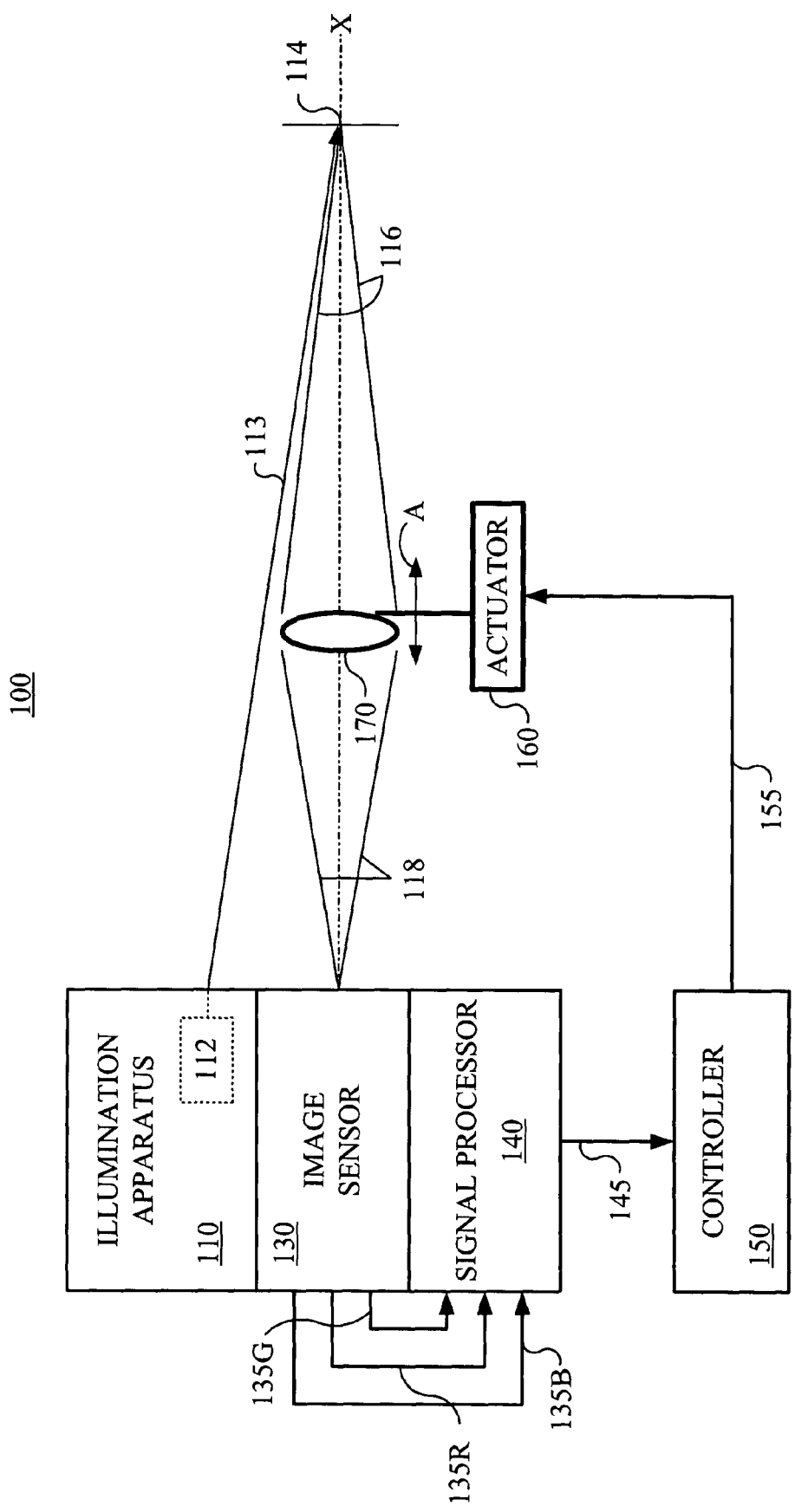
FIG. 1 is block diagram of an axial chromatic aberration auto-focusing system according to an embodiment of the present invention.
Figure 5:
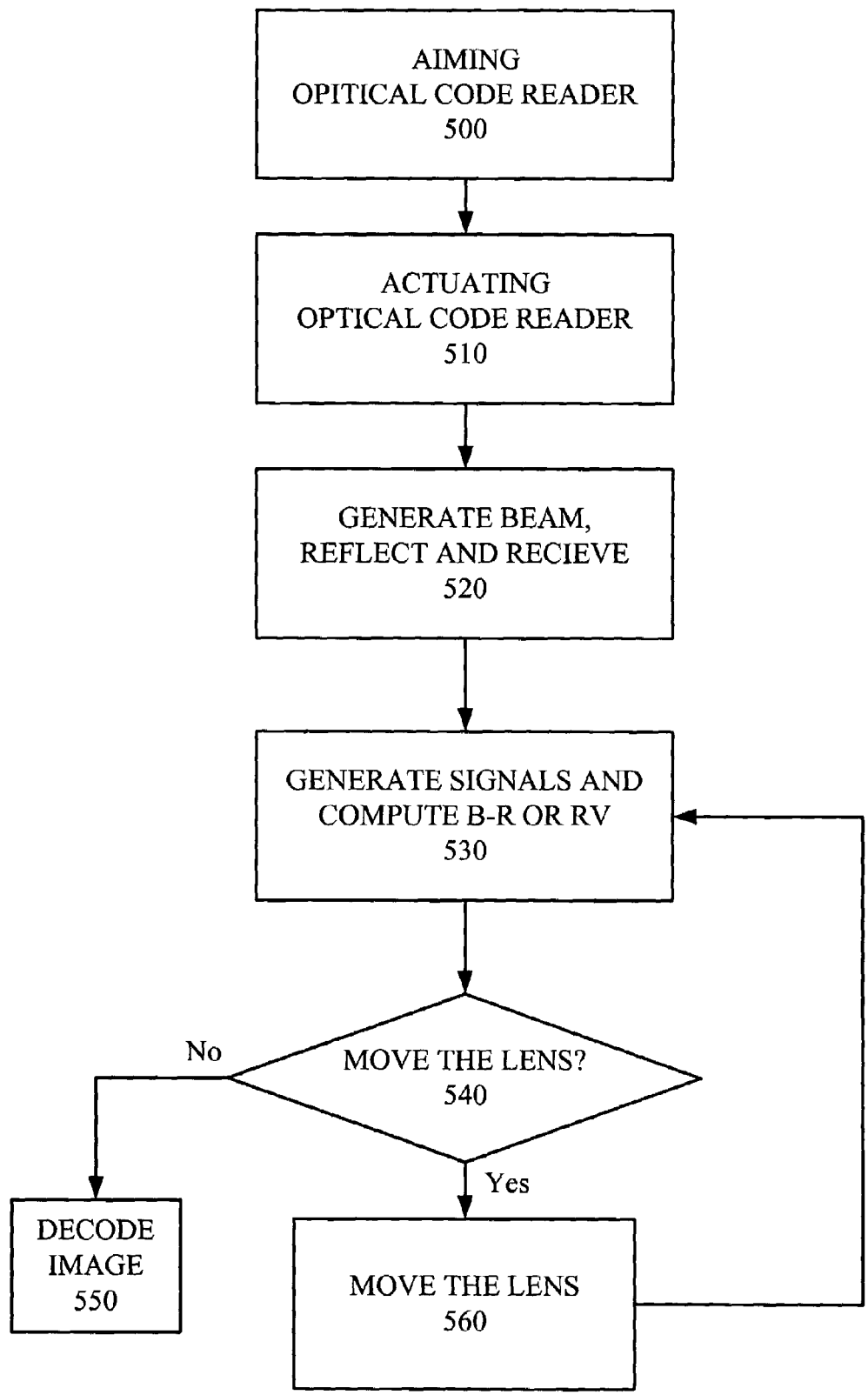
FIG. 5 is a flow chart of a method of operation using the system shown in FIG. 1 and according to the present invention.

With reference to FIG. 1, there is illustrated an axial chromatic aberration auto-focusing system designated generally by reference numeral 100 in accordance with the present invention. FIG. 5 illustrates a flow chart of a method of operation using the system shown in FIG. 1. The auto-focusing system 100 and method are adaptable and configurable for incorporation in various devices, such as cameras, mobile phones, PDAs, terminals, etc., for providing instantaneous or real-time auto-focusing of an image and without being prone to errors due to parallax.

The system 100 and method are especially suited and described herein for incorporation in optical code readers used for imaging and reading optical codes, such as barcodes. Preferably, the auto-focusing system 100 is configured and dimensioned to fit within a conventional form factor of an optical code reader 200 (see FIGS. 2 and 3), such as the SE900 and SE1200 form factors developed by Symbol Technologies, Inc., of an optical code reading system 300. The optical code reading system 300 further includes a display 302, a housing 304 encasing at least one processor, and a keyboard 306. The display 302, housing 304 and keyboard 306 can be, for example, a point-of-sale terminal.

The auto-focusing system 100 utilizes the principles of axial chromatic aberration for determining a focus quality of an image and adjusting, if necessary, the focus quality, accordingly. As shown in FIG. 1, the auto-focusing system 100 includes an illumination apparatus 110, a color image sensor 130, a signal processor 140, an controller 150, an actuator 160 and a lens 170. The lens 170 is positioned in an optical axis-X of the auto-focusing system 100 and operatively coupled to the actuator 160 for movement along the optical axis-X. Actuation of the actuator 160 by the controller 150 causes the lens 170 to move along the optical axis-X as described, for example, in U.S. patent application Ser. No. 10/425,344 filed on Apr. 29, 2003, the contents of which are incorporated herein in their entirety. The lens 170 can be several lenses (an optics arrangement) where one or more of the lenses are moved along the optical axis-X.

The color image sensor 130, the signal processor 140 and the controller 150 are part of a feedback system for controlling the position of the lens 170 along the optical axis-X in accordance with the determined focus quality of the image impinged on the image sensor 130. Alternatively, the controller 150 can be incorporated or integrated with the signal processor 140, where the signal processor 140 controls actuation of the actuator 160.

The illumination apparatus 110 includes an illumination source 112, such as one or a plurality of LEDs, for generating light 113 for illuminating a target area having an optical target 114, such as a barcode symbol, and creating reflected light 116. The light 113 propagates from the optical code reader 200 (FIGS. 3 and 4) as shown in FIG. 1, and impinges on the optical target 114 to create the reflected light 116. The reflected light 116 includes components representative of the optical target 114.

Figure 2A:
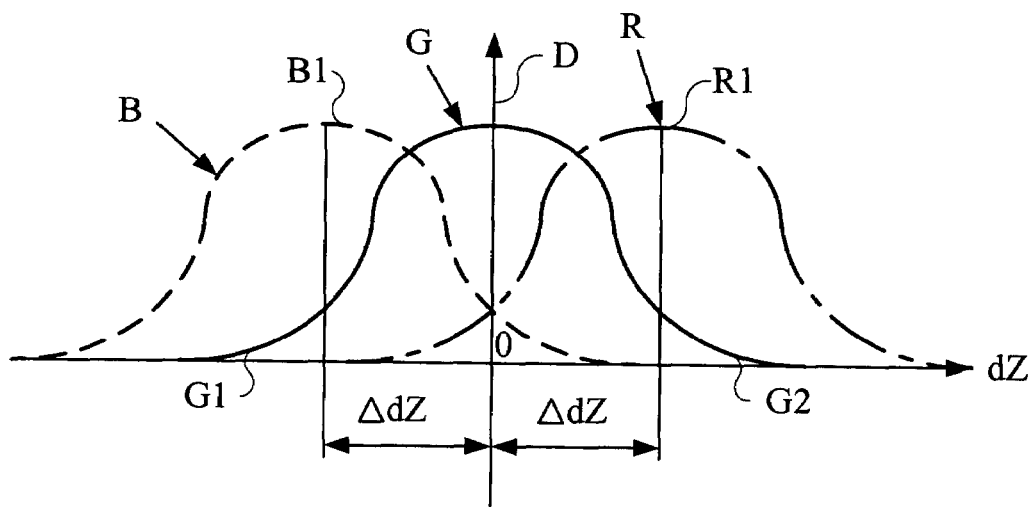
FIG. 2A is a graph illustrating blue, green, and red wavelengths with respect to an imaging plane (vertical axis) of the auto-focusing system shown in FIG. 1.
Figure 2B:
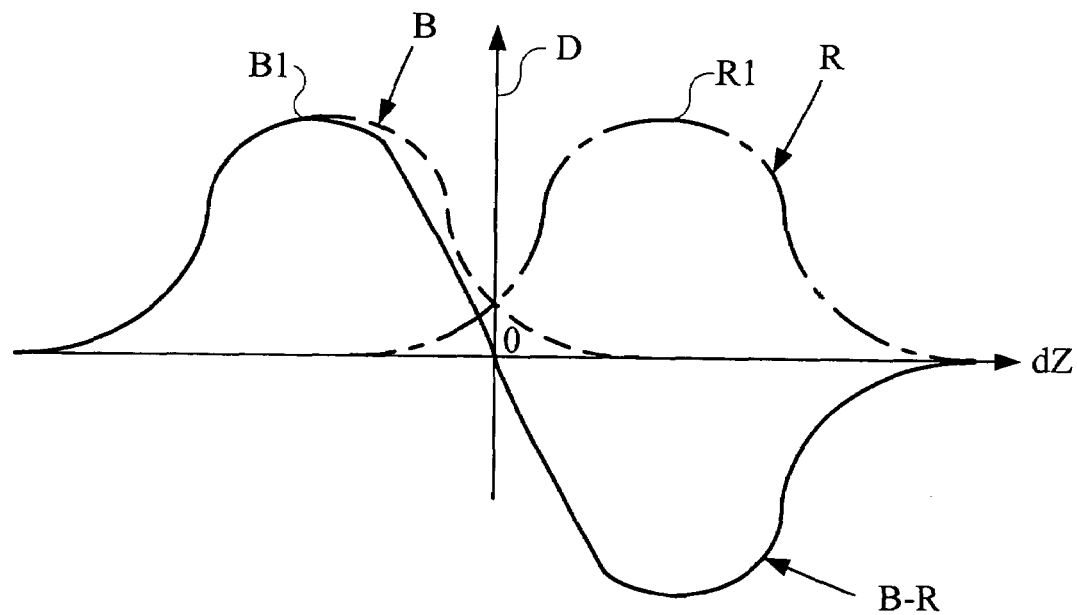
FIG. 2B is a graph illustrating blue, red and blue minus red wavelengths with respect to the imaging plane of the auto-focusing system shown in FIG. 1 of an image having a desired focus.
Figure 2C:
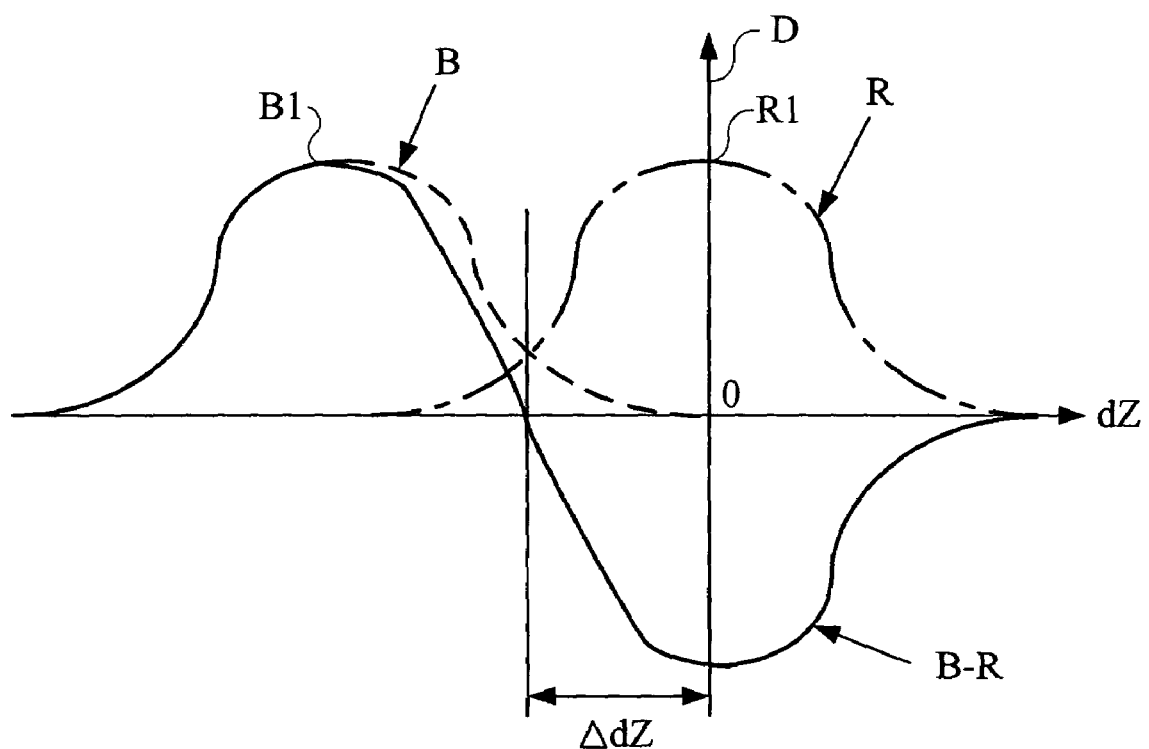
FIG. 2C is a graph illustrating blue, red and blue minus red wavelengths with respect to the imaging plane of the auto-focusing system shown in FIG. 1 of an image having a focus less than a desired focus.

With continued reference to FIG. 1, the reflected light 116 passes through the lens 170 and is directed onto the image sensor 130 as directed light 118 to project an image of the optical target 114 on a planar surface, i.e., imaging plane, identified by the letter "D in FIGS. 2A-2C, of the image sensor 130. Preferably, the auto-focusing system 100 actuates the illumination source 112 only if the ambient lighting is too low for directing adequate light onto the optical target 114 and creating sufficient reflecting light 116 for impinging the image of the optical target 114 onto the planar surface of the image sensor 130. In applications where sufficient ambient lighting is guaranteed, e.g., in a retail store, the auto-focusing system 100 of the present invention can be provided without the illumination apparatus 110.

The lens 170 is formed from a suitable optical material, such as glass, plastic, or a combination of these and other materials. The lens 170 is preferably coated with a material for reducing or minimizing reflection and/or refraction of the reflected light 116. The lens 170 is preferably coated with a material for reducing or minimizing the transmission of wavelength components which are not needed for determining if the image has a desired focus utilizing the principles of axial chromatic aberration.

The lens 170 is designed (or selected) to provide axial chromatic aberration by focusing the wavelength components of the directed light 118 at different focus planes, including the imaging plane of the image sensor 130. It is preferred, however, that the lens 170 does not focus the wavelength components at focus planes which are too apart which may significantly compromise the focus quality of the image, i.e., cause a significantly blurred image.

As described in more detail below, the auto-focusing system 100 of the present invention then utilizes the principles of axial chromatic aberration to determine the focus quality of the one or more wavelength components impinged onto the image sensor 130, and to adjust, if necessary, the position of the lens 170 along the optical axis-X. As such, the system 100 also adjusts the focus quality of the one or more wavelength components. The system 100 continues to adjust the position of the lens 170 until the one or more wavelength components of the directed light 118 have a desired focus as determined by the signal processor 140.

As shown in FIG. 2A, when the lens 170 is at a given position, at least one of the wavelength components impinging onto the image sensor 130 does not have an optimum focus quality due to axial chromatic aberration. In FIG. 2A, the vertical axis D represents the imaging plane of the image sensor 130, as well as indicating intensity or magnitude (sharpness) of the three illustrated wavelengths. The horizontal axis represents defocus distance, i.e., the distance the maximum peak of the wavelength is offset from the imaging plane D.

A blue B wavelength component of the directed light 118 optimally focuses on focus plane B1, a red R wavelength component of the directed light 118 optimally focuses on focus plane R1, and a green G wavelength component of the directed light 118 optimally focuses on the imaging plane D. The blue and red focus planes B1, R1 are offset by a certain defocus distance from the imaging plane D of the image sensor 130. The amount of offset with respect to the imaging plane D is referred to as a defocus differential and indicated by the symbol ΔdZ in FIG. 2A.

The defocus differentials for the blue and red wavelength components in FIG. 2A are identical, since the green G wavelength component is optimally focused on the imaging plane D. That is, the portion or peak of the green wavelength having the maximum intensity or magnitude impinges on the imaging plane D. Therefore, the defocus differential for the green wavelength components is zero, i.e., as shown in FIG. 2A.

The imaging plane D correlates in space to the planar surface of the image sensor 130. The planar surface includes a two-dimensional array of cells or photo sensors that correspond to image elements or pixels in a field of view of the auto-focusing system 100. The image sensor 130 is preferably a two-dimensional or area charge coupled device (CCD) having associated circuitry for producing electronic signals corresponding to a two-dimensional array of pixel information corresponding to the field of view.

The image sensor 130 is preferably responsive to more than one wavelength component of visible light, such as a triple CCD structure image sensor that is responsive to the blue B, red R, and green G wavelength components of the directed light 118. Each wavelength component, and particularly, only the blue B, red R, and green G wavelength components, is detected by the image sensor 130 and the associated circuitry.

The image sensor 130 and/or associated circuitry generate data signals 135B, 135R and 135G corresponding to each wavelength component impinging on the imaging plane D. Alternatively, the processor 140 generates the data signals 135B, 135R and 135G by executing a set of programmable instructions upon receiving wavelength component data from the image sensor 130. The data signals 135B, 135R and 135G are representative of the intensity or magnitude of their respective wavelength component impinging on the image sensor 130. The auto-focusing system 100 is configurable and/or programmable for the data signals 135B, 135R and 135G to be representative of other characteristics of the wavelength components.

The intensity or magnitude of each wavelength component can be actually measured, e.g., in lumens, watts, etc., by the system 100 using photometry and radiometry techniques as known in the art. However, preferably, the system 100 assigns a number to each wavelength component impinging on the image sensor 130, for example, a value from one to ten, according to the component's apparent intensity as estimated by the image sensor 130 and/or associated circuitry. The latter method requires fewer components and computations.

The image sensor 130 communicates the respective data signals 135B, 135R and 135G to the signal processor 140. The signal processor 140 analyzes one or more of the data signals 135B, 135R and 135G to determine the focus quality of the image impinged on the image sensor 130.

In one preferred analysis method in accordance with the present invention, the signal processor 140 subtracts the value communicated by the data signal 135R and representative of the red wavelength component from the value communicated by the data signal 135B and representative of the blue wavelength component. The signal processor 140 accesses a look-up table or other data structure stored in an external memory to determine whether the resulting value, referred to as the sharpness difference, is within a predetermined desired range. The predetermined desired range can also be stored in within a memory of the signal processor 140, such as ROM.

The signal processor 140 determines the image has an optimum focus quality, if the sharpness difference is zero, or substantially near zero, as shown in FIG. 2B. Accordingly, the predetermined desired range is zero plus or minus a value, such as 0±0.5. In FIG. 2B, the signal processor 140 determines the image to have an optimum focus quality, i.e., is optimally focused, since the value of the blue wavelength component minus the red wavelength component (B-R) is zero. As shown in FIG. 2B, the B-R wavelength intersects the vertical and horizontal axes at the origin.

The B-R wavelength shown in FIG. 2B corresponds to subtracting the red R wavelength from the blue B wavelength shown in FIG. 2A. If in FIG. 2A, the point of intersection of the blue B and red R wavelengths shifts either to the left or to the right, the sharpness difference of the blue minus red wavelength components impinging on the imaging plane D would be less than zero or greater than zero, respectively.

If the point of intersection shifts to the left of the imaging plane D, it is apparent from FIG. 2C, that the red wavelength component has a greater intensity or magnitude than the blue wavelength component at the imaging plane D. If the point of intersection shifts to the right of the imaging plane D, it is evident from FIG. 2C, that the blue wavelength component has a greater intensity or magnitude than the red wavelength component at the imaging plane D. In either case, the signal processor 140 determines (if the shift is significant, i.e., greater than a threshold amount) that by subtracting the red wavelength component represented by 135R from the blue wavelength component represented by 135B, the sharpness difference is outside the predetermined desired range, and accordingly, the lens 170 needs to be moved.

In short, the sharpness difference is a focus discriminator, since it enables the auto-focusing system 100 to determine whether the image has a desired focus or not, and whether to adjust the position of the lens 170 along the optical axis-X. The sharpness difference also indicates the direction of movement for the lens 170. If the sharpness difference is positive, then the lens 170 should be moved toward a red focus position R1, i.e., away from the image sensor 130. If the sharpness difference is negative, then the lens 170 should be moved toward a blue focus position B1, i.e., toward the image sensor 130.

In a "smart" auto-focusing system 100, the signal processor 140 accesses a look-up table or other data structure for correlating the sharpness difference with the amount of movement for the lens 170 along the optical axis-X. The signal processor 140 then generates a control signal 145 communicating the direction and amount of movement for the lens 170. The controller 150 receives the control signal 145 and generates an actuation signal 155 for actuating the actuator 160 for an amount of time required to move the lens 170 the determined amount and in the communicated direction.

The feedback system continues to generate and analyze data signals for computing the B-R value, i.e., the sharpness difference, and accordingly moves the lens 170, until the sharpness value is within the predetermined desired range. At that point, the image has a desired focus, for example, a focus suitable for decoding the image representative of the optical code.

It is contemplated that measurement of the sharpness difference can be replaced or complemented with estimation of the blur or point spread function that is reciprocated to the image sharpness. Further, it is contemplated that the sharpness difference can equate to R-B, instead of B-R.

In an alternative analysis method, the signal processor 140 determines the focus quality of the image impinged onto the image sensor 130 by analyzing only the data signal 135G utilizing the principles of axial chromatic aberration. Even though this alternative analysis method is described herein with analysis of the data signal 135G, one skilled in the art can appreciate the system 100 to be designed for analyzing one of the other data signals 135B or 135R in accordance with the principles of axial chromatic aberration.

This alternative analysis method is particularly preferred when the reflected light 116, and hence, the directed light 118, does not include blue and red wavelength components. As such, the image sensor 130 does not generate data signals representative of the intensity and magnitude of the blue and red wavelength components impinged onto the imaging plane D, and hence, the previously described analysis is not possible.

As shown in FIG. 2A, axial chromatic aberration focuses the red wavelength at a near field, the green wavelength at an intermediate field, and the blue wavelength at a far field. Therefore, according to this particular orientation of the focus fields, the signal processor 140 and/or associated circuitry determines whether a value representative of the intensity or magnitude of the green wavelength component impinging on the imaging plane D substantially equals a value representative of the maximum intensity or magnitude of the green wavelength. If the earlier value substantially equals the latter value, then the signal processor 140 determines that the green wavelength component impinging on the imaging plane D is representative of the peak portion of the green wavelength, and the image has a desirable focus quality, e.g., a focus quality suitable for decoding the image. Hence, movement of the lens 170 is not necessary.

The data signal 135G communicates the value representative of the intensity or magnitude of the green wavelength component impinging on the imaging plane D. The value can be an actual measurement of the intensity or magnitude of the green wavelength component impinging on the imaging plane D, or a value assigned, as described above, in accordance with the component's apparent intensity as estimated by the image sensor 130 and/or associated circuitry. The latter method requires fewer components and computations.

The signal processor 140 accesses an external memory to determine the value representative of the maximum intensity or magnitude of the green wavelength for comparing to the value communicated by the data signal 135G. The value representative of the maximum intensity or magnitude can also be stored within a memory of the signal processor 140, such as ROM.

If the two values are substantially unequal, the signal processor subtracts the value communicated by the data signal 135G from the stored value to obtain a positive resulting value. The signal processor can alternatively subtract the stored value from the value communicated by the data signal 135G to obtain a negative resulting value. In either case, the resulting value is a focus discriminator, as described above for the sharpness difference, since the resulting value enables the auto-focusing system 100 to determine whether the image has a desired focus or not, and whether to adjust the position of the lens 170 along the optical axis-X.

However, unlike the sharpness difference, the resulting value does not indicate the direction of movement for the lens 170, because the resulting value does not provide a point of reference of which portion of the green wavelength is impinging on the imaging plane D. This is because the green wavelength is a bell curve as shown in FIG. 2A. For example, if wavelength component G1 is impinging on the imaging plane D and the resulting value is X, the resulting value would also be X, if wavelength component G2 was impinging on the imaging plane D.

In a "smart" auto-focusing system 100, the signal processor 140 accesses a look-up table or other data structure for correlating the absolute value of the resulting value with the amount of movement for the lens 170 along the optical axis-X. The signal processor 140 then generates the control signal 145 communicating the amount of movement for the lens 170. The controller 150 receives the control signal 145 and generates the actuation signal 155 for actuating the actuator 160 for an amount of time required to move the lens 170 the determined amount.

However, since the actuation signal 155 does not communicate a direction of movement for the lens 170 to the actuator 160, the actuation signal 155 actuates the actuator 160 for a minute percentage of the amount of time required to move the lens 170 the determined amount. Accordingly, the lens 170 moves slightly, e.g., one or two micrometers, in one direction, for example, towards the image sensor 130. The actuator 160 then awaits the feedback system to re-compute the resulting value according to the newly impinged image on the imaging plane D.

If the absolute value of the re-computed resulting value decreased (approached zero), as compared to the resulting value, then the signal processor 140 instructs the controller 150 via the control signal 145 to generate another actuation signal 155 for actuating the actuator 160 to recommence movement of the lens 170 for a particular amount in the direction last moved. The amount last moved added to the particular amount equals the original determined amount.

If the absolute value of the re-computed resulting value increased, as compared to the resulting value, then the signal processor 140 instructs the controller 150 via the control signal 145 to generate another actuation signal 155 for actuating the actuator 140 to recommence movement of the lens 170 for a particular amount in an opposite direction from the direction last moved. The particular amount minus the amount last moved equals the original determined amount.

After the appropriate direction of movement is determined and while the actuator 140 moves the lens 170 in the appropriate direction, the feedback system continues to generate and analyze the data signal 135G for computing the resulting value, and accordingly the system 100 moves the lens 170, until the resulting value substantially equals zero. Alternatively, the system 100 moves the lens 170 until the resulting value is within a predetermined desired range, e.g., 0±0.5. At that point, the image has a desired focus, for example, a focus suitable for decoding the image representative of the optical code.

The processes described herein and illustrated by the flow chart shown in FIG. 5, with respect to the optical code reading system 300, are virtually instantaneous, for auto-focusing an image of an object, etc. in real-time. This is critical in applications where the auto-focusing system 100 is part of a mobile or stationary optical code reader positioned for focusing and reading optical codes in several microseconds on objects moving rapidly through the reader's field of view.

It is contemplated that the auto-focusing system 100 can be non-smart. Accordingly, the system 100 does not determine the direction and/or amount of movement of the lens 170 using a look-up table or other data structure, but the system 100 moves the lens 170 blindly, i.e., trial and error. The lens 170 is moved until the sharpness difference is determined to be within the predetermined desired range, or the resulting value substantially equals the stored value or is within the predetermined desired range.

The signal processor 140 and controller 150 utilize associated software and/or circuitry, including at least one set of programmable instructions capable of being executed by the signal processor 140, the controller 150, and/or hardware, such as comparators, adders, dividers, etc., for performing the various calculations and determinations, as well as generating the control and actuation signals 145, 155, described herein with reference to both analysis methods. The analysis methods performed by the signal processor 140 can alternatively be performed by logic circuitry implemented in an ASIC designed to determine the focus quality of the image. The logic circuitry can be part of the associated circuitry 208 of the optical code reader 200 as shown in FIG. 3.

The actuator 160 is responsive to an input that includes either a digital or an analog waveform. In one configuration, the actuator 160 includes an electric motor and associated circuitry. The actuation signal 155 is communicated to the associated circuitry for operating the motor. The duration and/or power level of the motor's operation is communicated by the actuation signal 155 for moving the lens 170 the determined amount. The motor is mechanically coupled to the lens by connecting arms, linkages, gears, or other structures known in the art.

Another actuator 160 suitable for use by the system 100 includes a voice coil assembly having a voice coil, a yoke, a magnet, and associated circuitry. An example of such an actuator is the subject of U.S. patent application Ser. No. 10/425,344 filed on Apr. 29, 2003, the contents of which are hereby incorporated by reference in their entirety. The actuation signal 155 is communicated to the associated circuitry where the associated circuitry generates a coil control signal. The coil control signal is communicated to a voice coil in the voice coil assembly for varying the flow of current through the coil. A variation in the current through the voice coil will cause a change in the flux created by the voice coil and the resulting electromagnetic force between the voice coil and the yoke. Since the yoke is being held stationary by the magnet, the voice coil will move with respect to the yoke. The voice coil may be attached to the lens 170 or positioned adjacent thereto such that movement of the coil will cause movement of the lens 170. When the voice coil is not attached to the lens 170, it may be mechanically coupled to the lens 170 by connecting arms, linkages, gears, or other structures known in the art.

Figure 4:
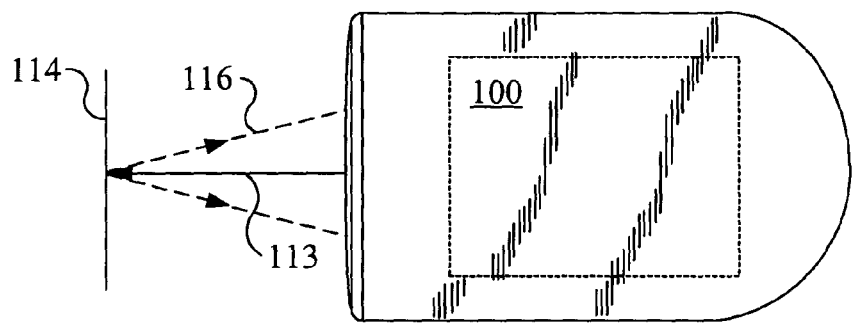
FIG. 4 is a top plan view of the optical code reading system shown in FIG. 3.
Figure 3:
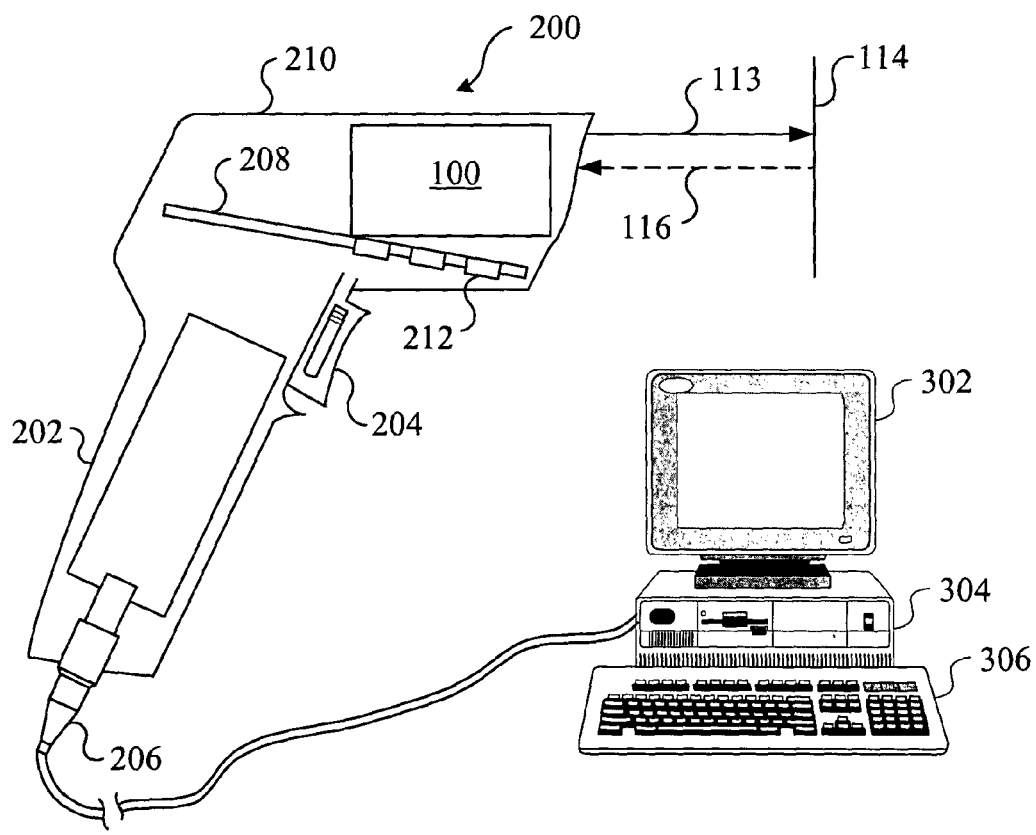
FIG. 3 is a side view of an optical code reading system according to an embodiment of the present invention.

FIGS. 3 and 4 show the invention within optical code reader 200. The axial chromatic aberration auto-focusing system 100 and the image sensor 180 are disposed within a head section 210 of the optical code reader 200. The optical code reader 200 further includes a handle portion 202 having an actuation mechanism 204, a connector 206, and associated circuitry 208 for operating the optical code reader 100. The associated circuitry 208 includes a decoder 212 as known in the art. The decoder 212 can be provided within the housing 304.

The actuation mechanism 204 is illustrated as a trigger assembly, but other suitable actuation mechanisms, such as push buttons or switches, may be substituted for the trigger assembly without departing from the scope of the present invention. The actuation mechanism 204 is preferably wired for actuating a read/decode operation of the optical code reader 200, as well as simultaneously operating the system 100 of the present invention.

The connector 206 couples the optical code reader 200 with other components (not shown) in the optical code reading system 300. Although the connector 206 is shown as a cable in FIG. 2, it is contemplated that other structures, including wireless configurations (e.g. radio frequency or infrared), may be employed for connecting the optical code reader 200 with the remaining components (not shown) of the optical code reading system 300.

The flow chart shown in FIG. 5 illustrates an exemplary method according to the present invention with respect to the optical code reading system 300. At step 500, the operator aims the optical code reader 200 of the optical code reading system 300 at the optical target 114. The optical code reader 200 is actuated in step 510 via the actuation mechanism 204. Upon activation of the optical code reader 200, the illumination source 112 generates light 113 and illuminates the optical target 114. At step 520, the light 113 impinges upon the optical target 114 and reflects back towards the optical code reader 200 as the reflected light 116. The reflected light 116 passes through the lens 170 and is directed towards the image sensor 130 as the directed light 118 which impinges on the imaging plane, i.e., planar surface, of the image sensor 130.

At step 530, the image sensor 130 and/or associated circuitry generates the data signals 135B, 135R, and 135G, and the signal processor 140 determines the sharpness difference, i.e., B-R, or the resulting value (RV) using the data signals 135B and 135R, or the data signal 135G, respectively. At step 540, the signal processor 140 analyzes the sharpness difference or the resulting value to determine whether movement of the lens 170 is required for increasing the focus quality of the impinged image.

If movement of the lens 170 is not required, the image is transmitted to the decoder 212 of the optical code reading system 300 at step 550 where the image is decoded. The decoder 212 can be resident within the signal processor 140 of the auto-focusing system 100 and includes decoding algorithms for decoding images representative of a plurality of symbologies as known in the art.

If movement of the lens 170 is required as determined at step 540, then, at step 560, movement of the lens 170 occurs in accordance with the determination. The process then enters a feedback loop where the system 100 re-generates and re-analyzes data signals 135B and 135R, or data signal 135G, for re-computing the sharpness difference or the resulting value, respectively, at step 530. The system 100 operates within the feedback loop until it is determined, at step 540, that movement of the lens 170 is not required, i.e., the signal processor 140 determines data encoded by the image is decodeable by said decoder.

The auto-focusing system 100 of the present invention can be programmed or configured by the addition of circuitry, ASICs, etc. for determining distance to the optical target 114 utilizing the principles of axial chromatic aberration. The intensity or magnitude of at least one wavelength component impinging on the imaging plane D is correlated to a distance between the lens or image sensor and the optical target using a look-up table or other data structure accessible by the signal processor 140. The determined distance aids the auto-focusing system 100 in focusing the image, in controlling the intensity of the light emitted by the illumination source 112, etc.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

The invention claimed is:

1. An optical code reading system for imaging and decoding an optical code, said optical code reading system comprising:
    an optical code reader comprising an image sensor for imaging said optical code and generating at least one data signal representative of a parameter of at least one wavelength component of said optical code impinging onto said image sensor, and at least one lens positioned for movement along an optical axis of said optical code reader, wherein each of said at least one data signal represents a particular color;
    a signal processor comprising means for performing an analysis utilizing principles of axial chromatic aberration and a value indicative of the parameter of a single wavelength component of the at least one wavelength component associated with a single data signal of the at least one data signal representing one of the colors, and means for determining an amount of movement of said at least one lens for adjusting a focus quality of an image corresponding to said optical code and impinged onto said image sensor, such that said amount of movement is determined based on the analysis;
    an actuator operatively coupled to said at least one lens for moving said at least one lens along said optical axis of said optical code reader by at least the determined amount for adjusting the focus quality of said image; and
    a decoder for decoding data encoded by said image.

2. The optical code reading system according to claim 1, wherein said processor further comprises means for determining a distance to said optical target by accessing at least one data structure and correlating the value indicative of the parameter of the single wavelength component to said distance.

3. The optical code reading system according to claim 1, further comprising a feedback system, including the image sensor and the signal processor, for repeatedly generating the at least one data signal and performing said analysis, until said signal processor determines the data is decodeable by said decoder.

4. The optical code reading system according to claim 3, further comprising a controller for controlling the actuation of said actuator.

5. The optical code reading system according to claim 1, further comprising an illumination apparatus for illuminating a field of view, said field of view including the optical code.

6. The optical code reading system according to claim 1, wherein said at least one wavelength component is selected from the group consisting of blue, green and red wavelength components.

7. The optical code reading system according to claim 1, wherein said means for performing said analysis comprises means for performing the steps of:
    determining a difference between said value and a value stored within a memory; and
    determining whether the difference necessitates movement of said at least one lens along said optical axis, wherein said amount of movement is determined if the difference necessitates movement of said at least one lens.

8. The optical code reading system according to claim 7, wherein the means for performing the analysis further comprises means for performing the step of:
    determining a direction of movement of the at least one lens when the determination is positive that the difference necessitates movement of the at least one lens along the optical axis, the determining a direction of movement comprising:
        first determining the amount of movement to be a minute movement and selecting a first direction of movement from a first and second direction along the optical axis;
        determining a new difference between a new value associated with imaging the optical code after the at least one lens was moved along the optical axis by the minute amount in the first direction and the stored value;
        comparing the previously determined difference between the value and the stored value to the new determined difference;
        when the new determined difference is bigger than the previously determined difference, determining that the direction of movement from an original position of the at least one lens is the second direction; and when the new determined difference is smaller than the previously determined difference, determining the direction of movement from the original position of the at least one lens is the first direction.

9. A method for imaging and decoding an optical code, said method comprising the steps of:
imaging said optical code by an image sensor and generating at least one data signal representative of a parameter of at least one wavelength component of said optical code impinging onto said image sensor, wherein each of said at least one data signal represents a particular color;
performing an analysis utilizing principles of axial chromatic aberration and a value indicative of the parameter of a single wavelength component of the at least one wavelength component associated with a single data signal of the at least one data signal representing one of the colors;
determining an amount of movement of at least one lens based on said analysis for adjusting a focus quality of an image corresponding to said optical code and impinged onto said image sensor, such that said amount of movement is determined based on the analysis;
moving said at least one lens by at least the determined amount for adjusting the focus quality of said image; and
decoding data encoded by said image.

10. The method according to claim 9, further comprising the step of determining a distance to said optical target by accessing at least one data structure and correlating the value indicative of the parameter of the single wavelength component to said distance.

11. The method according to claim 9, further comprising the step of repeatedly generating the at least one data signal and performing said analysis, until said data is decodeable by said decoder.

12. The method according to claim 9, wherein said at least one wavelength component is selected from the group consisting of blue, green and red wavelength components.

13. The method according to claim 9, wherein said step of performing an analysis comprises the steps of:
determining a difference between said value and a value stored within a memory; and
determining whether the difference necessitates movement of said at least one lens.

14. The method according to claim 13, wherein when the determination is positive that the difference necessitates movement of the at least one lens, the step of performing an analysis further comprises the step of determining a direction of movement of the at least one lens comprising the steps of:
first determining the amount of movement to be a minute movement and selecting a first direction of movement from a first and second direction;
determining a new difference between a new value associated with imaging the optical code after the at least one lens was moved by the minute amount in the first direction and the stored value;
comparing the previously determined difference between the value and the stored value to the new determined difference,
when the new determined difference is bigger than the previously determined difference, determining that the direction of movement from an original position of the at least one lens is the second direction; and
when the new determined difference is smaller than the previously determined difference, determining the direction of movement from the original position of the at least one lens is the first direction.

15. A system for adjusting a focus quality of an image impinging onto an image sensor and for decoding data encoded by said image, said system comprising:
means for generating at least one data signal representative of a parameter of at least one wavelength component of said image, wherein each of said at least one data signal represents a particular color;
means for performing an analysis utilizing principles of axial chromatic aberration and a value indicative of the parameter of a single wavelength component of the at least one wavelength component associated with a single data signal of the at least one data signal representing one of the colors;
an actuator for moving at least one lens in accordance with the analysis for adjusting the focus quality of said image, such that an amount of movement of said at least one lens is determined based on the analysis; and
a decoder for decoding data encoded by said image.

16. The system according to claim 15, wherein said means for performing an analysis comprises means for determining a distance to an optical target corresponding to said image by accessing at least one data structure and correlating the value indicative of the parameter of the single wavelength component to said distance.

17. The system according to claim 15, wherein said at least one wavelength component is selected from the group consisting of blue, green and red wavelength components.

18. The system according to claim 15, wherein said means for performing an analysis comprises:
means for determining a difference between said value and a value stored within a memory; and
means for determining whether the difference necessitates movement of said at least one lens.

19. The system for adjusting focus quality according to claim 18, wherein the means for performing the analysis further comprises means for performing the step of:
determining a direction of movement of the at least one lens when the determination is positive that the difference necessitates movement of the at least one lens, the determining a direction of movement comprising:
first determining the amount of movement to be a minute movement and selecting a first direction of movement from a first and second direction;
determining a new difference between a new value associated with an image impinged on the image sensor after the at least one lens was moved by the minute amount in the first direction and the stored value;
comparing the previously determined difference between the value and the stored value to the new determined difference;
when the new determined difference is bigger than the previously determined difference, determining that the direction of movement from an original position of the at least one lens is the second direction; and
when the new determined difference is smaller than the previously determined difference, determining the direction of movement from the original position of the at least one lens is the first direction.

20. A method for adjusting a focus quality of an image impinging onto an image sensor and for decoding data encoded by said image, said method comprising the steps of:
generating at least one data signal representative of a parameter of at least one wavelength component of said image, wherein each of said at least one data signal represents a particular color;
performing an analysis utilizing principles of axial chromatic aberration and a value indicative of the parameter of a single wavelength component of the at least one wavelength component associated with a single data signal of the at least one data signal representing one of the colors;

moving at least one lens in accordance with the analysis for adjusting the focus quality of said image, such that an amount of movement of said at least one lens is determined based on the analysis; and decoding data encoded by said image.

21. The method according to claim 20, wherein said step of performing an analysis comprises the step of determining a distance to an optical target corresponding to said image by accessing at least one data structure and correlating the value indicative of the parameter of the single wavelength component to said distance.

22. The method according to claim 20, wherein said at least one wavelength component is selected from the group consisting of blue, green and red wavelength components.

23. The method according to claim 20, wherein said step of performing an analysis comprises the steps of:
determining a difference between said value and a value stored within a memory; and
determining whether the difference necessitates movement of said at least one lens.

24. The method according to claim 23, wherein when the determination is positive that the difference necessitates movement of the at least one lens, the step of performing an analysis further comprises the step of determining a direction of movement of the at least one lens comprising the steps of:
first determining the amount of movement to be a minute movement and selecting a first direction of movement from a first and second direction;
determining a new difference between a new value associated with an image impinged onto the image sensor of the focusing system after the at least one lens was moved by the minute amount in the first direction and the stored value;
comparing the previously determined difference between the value and the stored value to the new determined difference,
when the new determined difference is bigger than the previously determined difference, determining that the direction of movement from an original position of the at least one lens is the second direction; and
when the new determined difference is smaller than the previously determined difference, determining the direction of movement from the original position of the at least one lens is the first direction.

25. A method for determining a focus discriminator for a focusing system, said method comprising the steps of:
generating a data signal representative of a parameter of a single wavelength component of an image impinged onto an image sensor of said focusing system;
performing an analysis by determining a difference between a value indicative of the parameter of the wavelength component and a value stored within a memory, wherein said difference is a focus discriminator indicating whether said image requires focusing by said focusing system; and
decoding data encoded by said image.

26. The method according to claim 25, wherein said method utilizes principles of axial chromatic aberration, wherein a wavelength having said first wavelength component has an optimum focus at a first focus plane and said stored value is representative of the maximum intensity or magnitude of the wavelength.

27. The method according to claim 25, determining a direction of movement of at least one lens of the focusing system for focusing the at least one lens, the determining a direction of movement comprising:
first moving the at least one lens a minute amount in a first direction selected from a first and second direction;
determining a new difference between a new value associated with an image impinged onto the image sensor after the at least one lens was moved by the minute amount in the first direction;
comparing the previously determined difference between the value and the stored value to the new determined difference;
when the new determined difference is bigger than the previously determined difference, determining that the direction of movement from an original position of the at least one lens is the second direction; and
when the new determined difference is smaller than the previously determined difference, determining the direction of movement from the original position of the at least one lens is the first direction.

* * * * *